Abbott & Sherburne,
Grain Ventilator.

2 Sheets, Sheet 2.

No. 111,163. Patented Jan. 24, 1871.

Witnesses,
W. J. Cambridge
L. E. Batcheller.

Inventors,
Levi Abbott
Joseph A. Sherburne
their Attorneys
Fischemach & Stearns

United States Patent Office.

LEVI ABBOTT, OF LEWISTON, MAINE, AND JOSEPH A. SHERBURNE, OF BOSTON, ASSIGNORS TO THEMSELVES AND EARL W. JOHNSON, OF BOSTON, MASSACHUSETTS.

Letters Patent No. 111,163, dated January 24, 1871.

IMPROVEMENT IN GRAIN-DRIERS.

The Schedule referred to in these Letters Patent and making part of the same.

*To all whom it may concern:*

Be it known that we, LEVI ABBOTT, of Lewiston, in the county of Androscoggin and State of Maine, and JOSEPH A. SHERBURNE, of Boston, in the county of Suffolk and State of Massachusetts, have invented a Method of Preserving Grain, of which the following is a full, clear, and exact description, reference being had to the accompanying drawing making part of this specification, in which—

Figure 3 is a detail to be referred to.

When grain is stored in large quantities in bulk, it is liable to become heated and to sprout, which materially diminishes its value, and for some purposes renders it unfit for use.

To prevent the quality of the grain from being impaired, is the object of our invention, which consists in one or more perforated tubes which pass through the grain and serve to conduct and distribute the external air, which circulates freely through the grain, whereby it is thoroughly ventilated and preserved in a dry state, which effectually prevents it from injury occasioned by heating and sprouting.

To enable others skilled in the art to understand and use our invention, I will proceed to describe the manner in which we have carried it out.

In the said drawing—

A represents an elevator, in which grain from cars or vessels is deposited previous to being distributed or again transported.

The interior of this elevator is divided by partitions 5 into a series of vertical compartments, B, extending from the floor $a$ to to the ceiling $b$, to accommodate and keep separate parcels of grain belonging to different parties.

Figure 1:
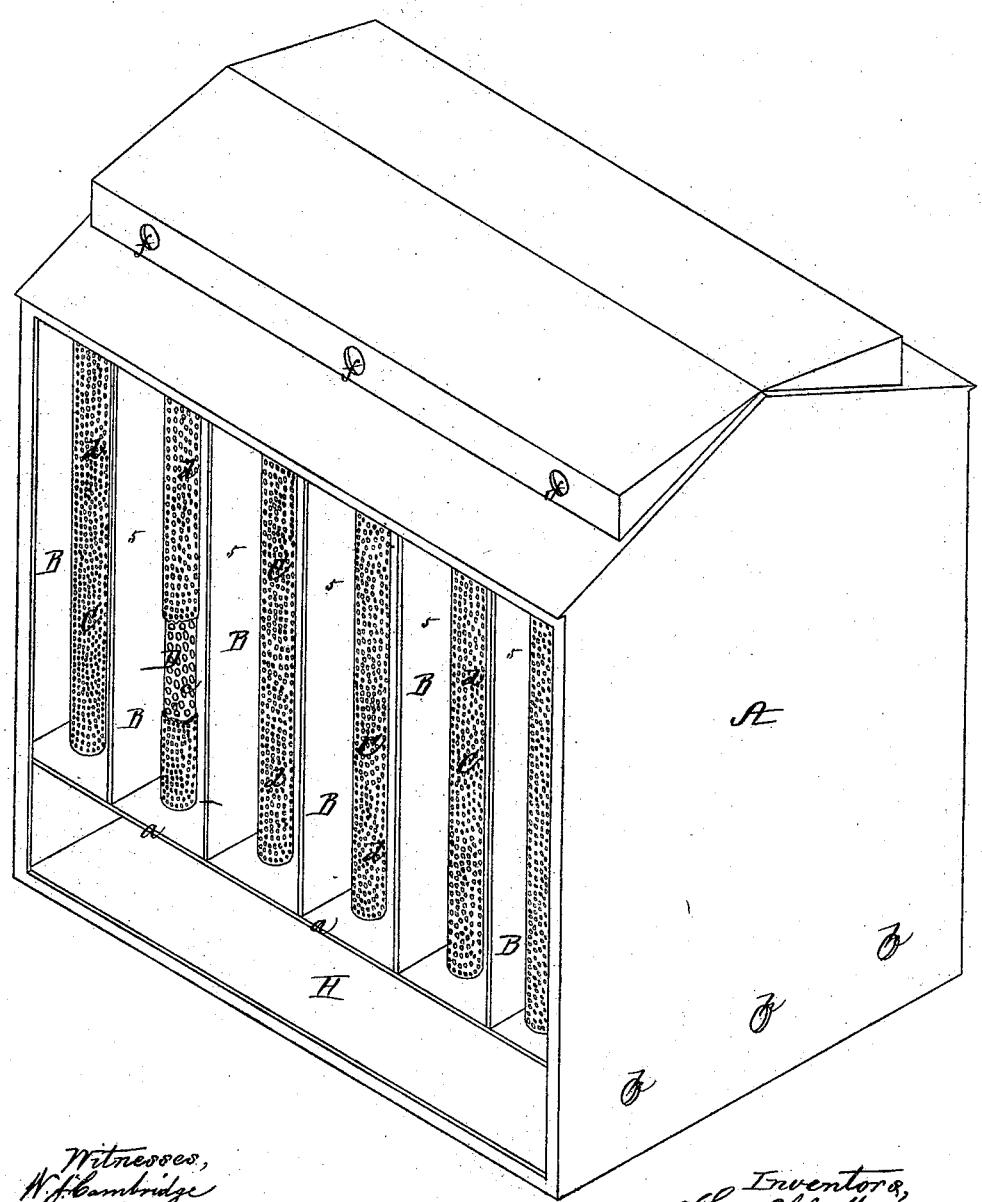
Figure 1 is a perspective view of a grain-elevator, with one of its sides removed for the purpose of representing the application of our invention thereto.
Figure 2:
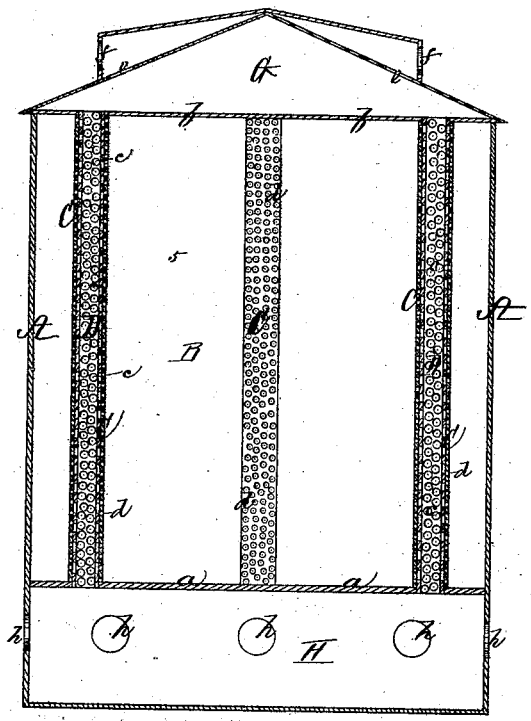
Figure 2 is a transverse vertical section through the same.
Figure 3:

Extending vertically up within each compartment is a series of metal pipes or tubes C, surrounding a series of perforated pipes or tubes, D, the inner tubes D being provided with perforations $c$, of considerable size, while the perforations $d$ in the outer tubes C are of a smaller size than those $c$, (see fig. 3,) and sufficiently small to prevent the kernels of grain contained in the compartments from passing into and obstructing the pipes, which open at the top into a chamber, G, communicating through openings $e\,f$ with the external air, and communicate at the bottom with a chamber, H, which is supplied with air through the openings $h$, by which construction the air is allowed to pass up the tubes from which it is distributed through their perforations to the grain, through which it circulates freely, thus securing perfect ventilation and preserving the grain in a dry state, or drying it, if damp when stored, which prevents it from heating and sprouting, as heretofore.

In order to more thoroughly diffuse the air through the grain, the tops of all but one of the ventilating-pipes in a compartment, B, may be closed by suitable caps or covers, which will serve to retard the progress of the air up the pipes, and insure its passage through their perforations into and through the grain, the air being made to finally escape from the compartment by the pipe whose top is open.

Instead of a perforated tube of metal, a wooden trunk or tube provided with large openings covered with wire-gauze may be employed, or an open framework surrounded by wire-gauze may be substituted therefor.

If desired, a fan-blower, communicating with the chamber H, may be employed to increase the volume and force of the currents of air up through the ventilating-tubes.

It is evident that our improvements may be applied with advantage to cars, vessels, and other receptacles where grain is deposited in bulk.

Where large quantities of grain are stacked in the field previous to being thrashed, one or more perforated ventilating-pipes communicating with the external air may be made to pass in any direction through the stack without departing from the spirit of our invention.

*Claim.*

What we claim as our invention, and desire to secure by Letters Patent, is—

The within-described perforated tubes D, surrounded by the metal pipes or tubes C, provided with the perforations $d$, and allowing an air-chamber between the said tubes, when applied to a grain-elevator, substantially as and for the purpose set forth.

Witness our hands this 15th day of November, A. D. 1870.

LEVI ABBOTT.
JOS. A. SHERBURNE.

Witnesses:
N. W. STEARNS,
L. E. BATCHELLER.